Feb. 28, 1950       H. B. ROYSHER       2,499,077
TENSION CATCH
Filed Dec. 12, 1947

INVENTOR.
Hudson B. Roysher
BY
ATTORNEY

Patented Feb. 28, 1950

2,499,077

UNITED STATES PATENT OFFICE 2,499,077

TENSION CATCH

Hudson B. Roysher, Los Angeles, Calif.

Application December 12, 1947, Serial No. 791,201

2 Claims. (Cl. 24—73)

This invention relates to a tension catch or other device adapted to hook or attach to elements by means of a member maintained under tension. Generally stated, the invention pertains to a catch or hook which is maintained under tension so as to prevent accidental dislodgement of the catch or hook, said device being compact, streamlined, self-enhoused, and arranged for use in a great variety of circumstances and for many purposes.

Heretofore hooks have been used extensively in attaching one object to another. Most hooks have been attached to a screw eye and have cooperated with an eye carried on another object which was to be attached to the object which actually carried the hook. In such prior constructions it was necessary that the hook be affixed to one object in a predetermined relationship to the screw eye carried by another object, and unless this relationship was carefully maintained the hook was readily dislodged.

The present invention relates to a hook which is provided with a retractor so that the hook is always maintained under tension. In this manner, once the hook has engaged an eye, grommet, or other element, the hook is substantially irremovable except by purposeful actuation of the parts. The hook can not be dislodged either accidentally or through vibration, and suitable tension is maintained between the two parts which are being connected.

Although hooks provided with spring-actuated elements have been known in the past, the present invention distinguishes therefrom in that the hook or catch is preferably made from a single stamping and the spring which maintains the hook under tension is entirely enclosed by the hollow body of the catch or hook. Moreover, in accordance with the present invention, means are provided whereby the bail or bight of the retractor, which forms a part of the hook or catch, may be anchored, and in a still further modification of the invention means are provided whereby such bight may be adjustably positioned on the anchor member so as to increase or decrease the tension in the catch and permit the hook to be adustably positioned in the event the element with which the hook is engaged stretches or shrinks.

Generally stated, therefore, the device of the present invention relates to a self-latching tension catch including a hollow body provided with a catch at one end. A rectangular retractor frame is slidably positioned in such hollow body. A hooked or rounded end of the retractor (generally termed a bight end) extends from the hollow body and a compression spring within such hollow body bears against the retractor frame. Lugs carried by the body form a seat for the other end of the spring and at the same time prevent the removal of the retractor frame from the hollow body.

The hollow body, catch and lug may be made from a single piece of sheet material so that the catch or hook is integral with the hollow body. In addition, an anchor member may be provided, such anchor member being arranged for attachment to a support and for holding engagement with the bight end of the retractor frame. The anchor member may be provided with a plurality of spaced notches, each selectively engageable with the bight end of the retractor frame so that the position of the retractor end with respect to the catch or hook may be varied. Furcated means may be provided, such means being arranged to straddle the anchor and facilitate the movement of the bight end of the retractor frame from one notch to another.

It is an object of the present invention, therefore, to disclose and provide a simple and efficient self-latching tension catch.

It is a further object of the invention to disclose and provide a self-latching hook including a hollow body, a retractor frame slidably positioned in such body, and a compression spring within the body.

A still further object of the invention is to disclose and provide a self-latching tension catch or hook including an anchor member having a plurality of spaced notches, each of the notches being arranged to engage the bight end of a retractor frame slidably mounted within the body of a hook.

A still further object of the invention is to disclose and provide a tension catch particularly adapted for use with screen doors, gates, cabinet doors, for maintaining tarpaulins, background and normal projection screens, and other sheet materials under uniform tension, and for many other purposes.

These and various objects, advantages and uses of the present invention will become apparent to those skilled in the art from the following detailed description of certain illustrative forms of devices embodying the inventive concept herein disclosed. In order to facilitate understanding, reference will be had to the appended drawings, in which.

Figure 1:
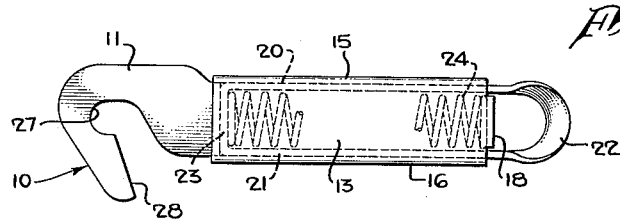
Fig. 1 is a side elevation of one form of tension catch embodying the present invention.
Figure 2:
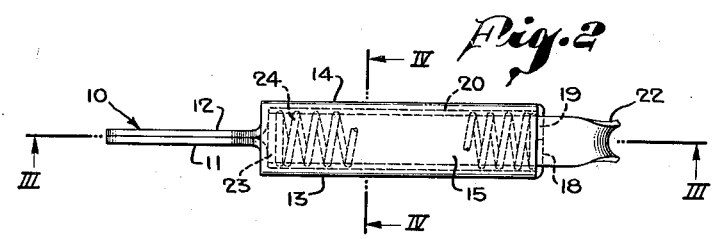
Fig. 2 is a plan view thereof.
Figure 3:
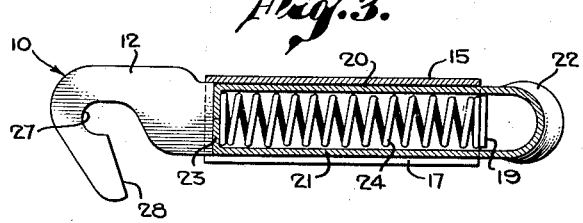
Fig. 3 is a longitudinal section taken along the plane III—III of Fig. 2.
Figure 4:
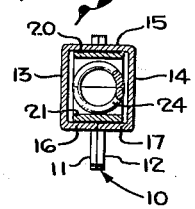
Fig. 4 is a transverse section taken along the plane IV—IV of Fig. 2.

The tension catch or hook shown in Figs. 1 to 4 comprises a hook element provided with a substantially square hollow body. In the form of device illustrated, the hook and hollow body are made of a single piece of sheet material cut to a pattern and then formed.

The hook itself, identified at 10, is composed of two parts 11 and 12 of substantially identical contour integral with the side walls 13 and 14 respectively of the body portion. The top portion also includes the top 15 integral with the sides 13 and 14. Each of the sides 13 and 14 is provided with flanges or edge portions which are bent inwardly toward each other so as to form bottom portions 16 and 17 respectively, these bottom portions abutting along a longitudinal line of abutment to form the bottom of a substantially hollow body portion. In addition, the sides 13 and 14 have end wings 18 and 19, these wings or lugs forming a retainer for a retractor frame which is slidably positioned within the hollow body.

The retractor frame may be made from a single strip of material having the parallel legs 20 and 21 extending from the rounded or hooked bight end 22. The free ends of the legs 20 and 21 may be bent inwardly toward each other so as to form the end 23. This entire retractor frame is slidably mounted within the hollow body of the tension catch and a compression spring 24 is placed within the retractor frame, one end of the spring being seated on or bearing against the end 23 of the frame, whereas the other end of the spring is seated against the lug or lugs 18 and 19. It will be clear from the drawings that the width of the legs 20 and 21 is such as to provide a sliding fit with the opposing inner surfaces of the square hollow body. This is important in that the sliding fit prevents relative rotation between the retractor frame and the hollow body. Also, it will be noted that the lug 18 carried by the hollow body is substantially the width of the distance between the parallel legs 20 and 21, which also aids in preventing relative rotation between the retractor and body.

It will be noted that the hook portions 11 and 12 are bent out of the plane of the sides 13 and 14 respectively so as to be in parallel contact in a plane substantially mid way of the planes occupied by the sides 13 and 14. These hook portions 11 and 12 may be spot-welded or furnace-brazed together so as to form a firm spring hook or catch.

In a preferred form of this invention the hook 10 is provided with a recess, indicated at 27, the center line of the recess being slightly within an extension of the inner face or edge 28 of the hook. This construction assures irremovability of the hook from engagement with a screw eye, grommet, or the like, which may fit within the semi-circular recess 27. Moreover, it may be noted that the center of curvature of the recess 27 is on an extension of the center line of the hollow body of the hook.

Not only is the hollow tension catch described hereinabove efficient in operation but it will be noted that it is extremely simple to manufacture. It is made of only three parts, namely, one housing and an integral hook and hollow body, a retractor frame made from a single strip of metal, and a spring. The assembly of these three elements is also extremely simple inasmuch as the lugs 18 or 18 and 19 are bent inwardly only after the hollow body has been formed and the retractor and spring have been positioned within the hollow body. It is to be understood that although the drawings illustrate lugs 18 and 19 extending from both of the sides of the hollow body, the same effect may be obtained by having but a single lug straddle the opening and extend from but one side of the body.

The bight 22 may be attached to any anchor means such as a screw eye firmly fastened in one of the objects or parts thereof which it is desired to removably connect to another object by means of the hook.

Figure 6:
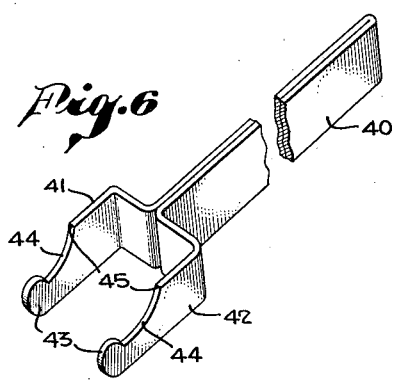
Fig. 6 is a perspective view of a tool which may be used in conjunction with the device shown in Fig. 5 for adjustably positioning the tension hook on the anchor member.
Figure 5:
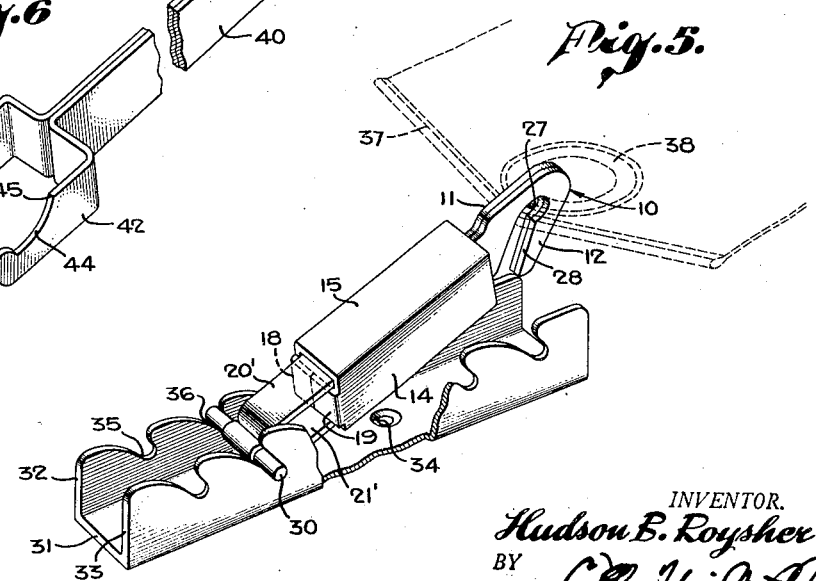
Fig. 5 is a perspective view, partly broken away, of a somewhat modified form of tension catch including an adjustable anchor member.

The modification of the invention illustrated in Figs. 5 and 6 primarily concerns itself with an anchor member. In this modification the upper and lower legs 20' and 21' of the retractor terminate, externally of the hollow body of the hook, in a transverse pin 30 which may be attached to or grasped by the bight portion of the retractor in any suitable manner. In Fig. 5 the anchor member comprises a channel 31 having upstanding webs 32 and 33, such channel being provided with means for attaching the same to a foundation or supporting structure. Such means may comprise the ports, such as 34, through which screws, rivets or the like may be passed. The upstanding webs 32 and 33 are provided with a plurality of longitudinally spaced notches, such as the notches 35, 36, and the like. Each of said notches is arranged to engage and hold the retractor pin 30. If, therefore, the anchor member 31 is attached to a frame within which a tarpaulin, projection screen or the like is to be hung and maintained under tension, the hook 10 may be caused to engage the grommet 38 of the projection screen 37 and by suitable placement of the retractor pin 30 in a notch of the anchor member, the canvas or projection screen may be maintained under desired tension.

In the event projection screen 37 (or other screen, tarpaulin, or the like) expands and it is necessary to increase the tension under which such screen is maintained, such increase in tension may be readily accomplished by simply moving the retractor pin from one notch to another notch more distantly removed from the hook 10. In order to facilitate such movement of the retractor pin from engagement with one notch into engagement with another notch, a tool of the character shown in Fig. 6 may be used.

The tool shown in Fig. 6 may also be made from a single strip of metal folded upon itself to form the handle 40, the device having furcated end portions 41 and 42 spaced a distance sufficient to straddle the rib or channel comprising the anchor member. Each of the furcated ends 41 and 42 is preferably provided with an enlarged end portion, such as 43, and a concave edge 44. The distance from the extreme end of the device to the point 45 (at which the concave edge blends with the body of the device) is preferably slightly greater than the depth of each of the webs 32 and 33. If it is desired to move the retractor pin 30 from the notch 36 to the notch 35, it is only necessary to place the tool shown in Fig. 6 astride the anchor member 31 with the concave portions 44 of the tool in contact with the ends of the retractor pin 30 and with the rounded ends 43 bearing against the support to which the anchor member 31 is attached and swing the handle 40 in the desired direction of movement of the retractor pin 30, thereby causing the retractor pin 30 to move along the outer edges of the webs 32 and 33 from notch 36 to notch 35.

Thus I have disclosed an economically made, rugged tension catch, readily connected to, or disconnected from objects to be springingly secured together. It will be noted that tension exerted on hook 10 is distributed equally between opposing side walls 13 and 14 so that there is no tendency to deform or cant the hollow body with respect to the sliding retractor train when tension is applied to the device. Hence, the catch is not subject to binding in operation.

Those skilled in the art will appreciate the great variety of uses to which the tension catch or hook of the present invention may be put and the simplicity and economy of the structure herein disclosed. All changes, modifications and adaptations embraced by the appended claims are included within the scope of this invention.

I claim:

1. As an article of commerce, a self-latching tension catch, consisting of: an outer hollow body of rectangular section provided with integral top, bottom, and spaced side walls, said side walls including lugs forming an integral end wall for the body, said side walls being provided with integral hook portions, said hook portions being bent out of the planes of the sides into contact in a plane parallel to but intermediate the side walls to distribute tension applied to the hook substantially equally between the side walls; a one-piece frame within the hollow body, said frame comprising a bight having a pair of legs extending into the body in sliding contact with the side walls thereof and inturned lugs on the inner edges of the legs to form an abutment; and a compression spring within the body with its ends resting against said abutment and the integral end wall of the body.

2. An article of commerce of the character stated in claim 1, wherein the composite hook includes a depression having its axis and edges parallel to the direction of movement of the frame, and a guiding edge inclined to said axis and intersecting an edge of the depression at a point removed from the base thereof.

HUDSON B. ROYSHER.

REFERENCES CITED

The following references are of record in the file of this patent:

UNITED STATES PATENTS

| Number | Name | Date |
|---|---|---|
| 892,439 | Marggraff | July 7, 1908 |
| 1,039,945 | Howe | Oct. 1, 1912 |
| 1,206,225 | Joly | Nov. 28, 1916 |
| 1,364,427 | Corey | Jan. 4, 1921 |
| 1,449,346 | Pagel | Mar. 20, 1923 |
| 1,463,071 | Dow et al. | July 24, 1923 |
| 1,528,712 | Ward | Mar. 3, 1925 |
| 1,549,262 | Johnson | Aug. 11, 1925 |
| 1,598,744 | Potter | Sept. 7, 1926 |
| 1,787,202 | Kendall | Dec. 30, 1930 |
| 2,083,331 | Illsche | June 8, 1937 |
| 2,130,693 | Nashe et al. | Sept. 20, 1938 |
| 2,358,739 | Schoeninger | Sept. 19, 1944 |